United States Patent [19]

Itoh et al.

[11] Patent Number: 5,398,219
[45] Date of Patent: Mar. 14, 1995

[54] MAGNETO-OPTICAL RECORDING MEDIUM WITH AMORPHOUS ALLOY FILM LAYERS

[75] Inventors: Masaki Itoh; Eizoh Fukami, both of Tokyo, Japan

[73] Assignee: NEC Corporation, Tokyo, Japan

[21] Appl. No.: 165,668

[22] Filed: Dec. 13, 1993

[30] Foreign Application Priority Data

Dec. 21, 1992 [JP] Japan .................. 4-356264

[51] Int. Cl.$^6$ .................. G11B 11/00; G11B 7/24
[52] U.S. Cl. .................. 369/13; 369/275.2; 369/288; 360/59
[58] Field of Search .................. 369/13, 275.2, 275.1, 369/275.3, 275.4, 275.5, 288, 283, 286, 110; 360/114, 59, 131, 66; 365/122; 428/694 R, 695, 697, 694 ML, 694 SC, 694 MM, 694 NF, 626, 652, 678

[56] References Cited

U.S. PATENT DOCUMENTS

| | | | |
|---|---|---|---|
| 4,853,912 | 8/1989 | Akasaka et al. | 369/73 |
| 5,018,119 | 5/1991 | Aratani et al. | 369/13 |
| 5,168,482 | 12/1992 | Aratani et al. | 369/13 |

FOREIGN PATENT DOCUMENTS

| | | |
|---|---|---|
| 0415449 | 3/1991 | European Pat. Off. |
| 0416656 | 3/1991 | European Pat. Off. |
| 0498435 | 8/1992 | European Pat. Off. |
| 0498455 | 8/1992 | European Pat. Off. |
| 0509836 | 10/1992 | European Pat. Off. |
| 0524315 | 1/1993 | European Pat. Off. |

OTHER PUBLICATIONS

Patent Abstracts of Japan, vol. 16, No. 35 of JP3242845, Jan. 28, 1992.
Patent Abstracts of Japan, vol. 15, No. 322 of JP3116566, Aug. 16, 1991.

*Primary Examiner*—Ali Neyzari
*Attorney, Agent, or Firm*—Sughrue, Mion, Zinn, Macpeak & Seas

[57] ABSTRACT

A magnetooptical recording medium having a higher recording density, improved bit error rate and superior weather resistance and a recording and playback method for the same are provided. The magnetooptical recording medium has a first magnetooptical layer having a high Curie temperature, a second perpendicularly magnetizable magnetooptical layer having a low Curie temperature and a third perpendicularly magnetizable magnetooptical layer having an intermediate Curie temperature set between the Curie temperatures of the first and second magnetooptical layers, laminated in this order on a substrate. The first, second and third magnetooptical layers are formed respectively of amorphous alloys containing GdFeCo, TbFeTi and TbFeCoTi as the main component thereof. The first, second and third magnetooptical layers are exchange-coupled at 10° C. to 90° C., and the first and third magnetooptical layers are not magnetostatically coupled in the external magnetic field for reading use at the temperature at which the magnetization of the second magnetooptical layer is diminished.

5 Claims, 7 Drawing Sheets

MAGNETO-OPTICAL RECORDING MEDIUM WITH AMORPHOUS ALLOY FILM LAYERS

BACKGROUND OF THE INVENTION

1. Field of the Invention

The present invention relates to a magnetooptical recording medium for recording and reproducing data by utilizing a magnetooptical effect by means of irradiation of a laser beam, and to a method and apparatus for recording and reproducing data to and from the same.

2. Description of the Related Art

Optical disks or the like for writing and reading data by means of a laser beam is known to be superior in recording density and storage capacity.

As an optical recording medium such as the rewritable optical disk and the like, magnetooptical ones utilizing the magnetic Kerr effect have been used in general. FIG. 1 is a schematic cross-sectional view of a conventional magnetooptical recording medium of the type described in, for example, SPIE Proceeding, Vol. 1316, pp. 81 to 90, 1990.

The magnetooptical recording medium shown in FIG. 1 comprises a transparent substrate 101, and a transparent interference layer 102, a first magnetooptical layer 103 made of a ferrimagnetic amorphous alloy of GdFeCo with a high Curie temperature, a second magnetooptical layer 104 made of a perpendicularly magnetizable ferrimagnetic amorphous alloy of TbFe with a low Curie temperature, and a dielectric protective layer 106 which are laminated in this order on the substrate 101.

The first magnetooptical layer 103 has a comparatively small coercive force at a temperature at which readout is executed, and the second magnetooptical layer 104 has a comparatively large coercive force at the temperature at which readout is executed. Besides, the first and second magnetooptical layers 103 and 104 are exchange-coupled at the temperature at which readout is executed.

A laser beam for writing or reading use is incident through the transparent substrate 101 to the magnetooptical recording medium so as to be focused in a diameter of about 1.4 μm in the vicinity of the first and second magnetooptical layers 103 and 104 by means of a focusing servo mechanism (not shown). As to the laser source, a semiconductor laser generating a laser beam having a wavelength (λ) of about 8300 angstrom is employed, and an objective lens having a numerical aperture (NA) of about 0.55 is also employed.

In order to write data thereinto, the second magnetooptical layer 104 is heated up to the vicinity of its Curie temperature depending on the data to be written and a recording bias magnetic field is applied to the region including this heated area, so that magnetization of the area heated to the vicinity of the Curie temperature is oriented to the direction opposite to the direction of the magnetization of the other area. When the temperature is lowered, the reverse magnetic domains written into the second layer are transferred to the first magnetooptical layer 103.

In order to read the data therefrom, a focused laser beam polarized substantially linearly is irradiated to the first magnetooptical layer 103 while being relatively moved thereto, and the beam reflected therefrom is detected optically by means of an analyzer. The magnetooptical film has an effect to rotate the polarization plane of the reflected beam through the magnetic Kerr effect. The rotational angle θk of the polarization plane of the reflected beam differs depending on the direction of perpendicular magnetization of the magnetooptical film, so that by passing the reflected beam through the analyzer before being entered into an optical detector, the data corresponding to the direction of magnetization can be read out as a change of light intensity.

Since such a magnetooptical film as described above is extremely liable to oxidization, it is sandwiched between the transparent interference layer 102 and dielectric protective layer 106 for effectively avoiding oxidization.

With the above-mentioned conventional magnetooptical recording medium and recording and playback method, however, a limitation is imposed thereon in recording density. This is because that the resolution of a reproduced signal obtained by reading optically the pattern of the reverse magnetic domains, which is the recorded data, depends on the wavelength (λ) of a laser beam of the laser source of the optical system for reproduction and on the numerical aperture (NA) of an objective lens, as is evidenced by the period of the reverse magnetic domains being expressed in about $\lambda/(2 \times NA)$ as its detection limit. Hence, in order to realize high density recording and reproducing in the magnetooptical recording medium, it is necessary to shorten the wavelength (λ) of the source beam and increase the numerical aperture (NA) of the objective lens.

However, such a laser beam source that can reliably irradiate a laser beam having a short wavelength is difficult to develop because of short life thereof. Besides, it is difficult to increase the numerical aperture of the objective lens because such a problem that the magnetooptical recording medium itself may be deflected, or other problems may arise therein.

In consideration of those problems, many attempts have been made on the realization of high recording density through improving the magnetooptical recording medium itself and the method for reading data therefrom. For example, a magnetooptical recording medium and playback method are disclosed in Japanese Patent Laid-Open Publication NO. 3-242845, in which written pattern of reverse magnetic domains is deformed and read out by utilizing the temperature rise of a magnetooptical layer through irradiating a laser beam for reading use, thus providing enough reproduction output from the reverse magnetic domains even below the limit in optical detection.

In the method as mentioned above, the magnetooptical recording medium has, as cross-sectionally shown in FIG. 2, a transparent substrate 111, and a transparent interference layer 112, a first magnetooptical layer 113, a second magnetooptical layer 114, a third magnetooptical layer 115 and a dielectric protective layer 116 laminated in this order on the substrate 111.

Each of the first magnetooptical layer 113, second magnetooptical layer 114 and third magnetooptical layer 115 is a perpendicularly magnetizable film made of an alloy of iron series transition metal and rare earth transition metal. The first, second and third magnetooptical layers 113, 114 and 115 are exchange-coupled at room temperature, and it is preferable that the first magnetooptical layer 113 has a film thickness of 250 angstrom or above, and the second magnetooptical layer 114 has a film thickness of 50 angstrom or above.

Disclosed in the above-mentioned publication is that the transparent substrate 111 is a glass 2P substrate, the transparent interference layer 112 is a Si₃N₄ film with a thickness of 800 angstrom, the first magnetooptical layer 113 is a GdFeCo film with a thickness of 300 angstrom, the second magnetooptical layer 114 is a TbFe film with a thickness of 150 angstrom, the third magnetooptical layer 115 is a TbFeCo film with a thickness of 550 angstrom, and the dielectric protective layer 116 is a Si₃N₄ film with a thickness of 800 angstrom.

FIG. 3 shows a well-known writing method generally applied to the magnetooptical recording medium of the type described in the publication as mentioned above, in which the magnetooptical recording medium is cross-sectionally shown at a state where the pattern of reverse magnetic domains is formed by the well-known writing method. In FIG. 3, the arrows in the films indicate the directions of magnetization. FIG. 4 is a top plan view of the magnetooptical recording medium as observed from the transparent substrate side. When the radius of the light beam for reading use is larger than the pitch of the reverse magnetic domains MK, since there exist plural reverse magnetic domains within a beam LB of the laser beam for reading use, the reverse magnetic domains MK cannot be individually read out by the playback method applied to the magnetooptical recording medium in the prior art. (In FIG. 4, each of the regions where magnetization is directed upward is shown by the right ascendant oblique lines, and its shape is schematically shown in circle.)

FIG. 5 shows a reading method applied to reverse magnetic domains shown in FIG. 3. In FIG. 5, by increasing the temperature in a region HT shown by the right descendent oblique lines up to the Curie temperature $T_{c2}$ or above of the second magnetooptical layer 114, the magnetization of the second magnetooptical layer 114 is substantially diminished, so that the exchange coupling between the first and third magnetooptical layers 113 and 115 is disengaged. As shown above, two reverse magnetic domains are discriminated by using the fact that the temperature of the magnetooptical film of the front area HT (first region, shown by right descendent oblique lines) is increased when observed in the direction that the magnetooptical recording medium is relatively moved.

FIG. 6 is a schematic cross-sectional view of the magnetooptical recording medium under the state shown in FIG. 5. If an external magnetic field $H_{PB}$ larger than the coercive force of the first magnetooptical layer 113 is applied under this state, the direction of magnetization of the first magnetooptical layer 113 is aligned with the direction of the external magnetic field $H_{PB}$ in the region HT shown by the right descendent oblique lines.

On the other hand, in the second region other than the right descendent oblique line region HT, that is, in the region where the temperature is lower than the Curie temperature $T_{c2}$, the magnetic coupling between the first and third magnetooptical layers 113 and 115 is maintained, so that the pattern of the reverse magnetic domains written in the third magnetooptical layer 115 is transferred to the first magnetooptical layer 113 and held therein.

FIG. 7 is a top plan view of the magnetooptical recording medium as observed from the transparent substrate side. As shown in FIG. 7, the reverse magnetic domain MK2 on the front side within the beam diameter of a laser beam for reading use becomes as "being masked", so that the reverse magnetic domain MK2 written in this area is apparently diminished, hence it appears that there exists only one reverse magnetic domain MK1 within the beam diameter thereof. As a result, the spatial frequency of the written reverse magnetic domains as observed through the laser beam for reading use appears lower than the actual frequency although the written reverse magnetic domains remain unchanged, resulting in an improvement in resolution during reproduction.

With the magnetooptical recording medium and recording and playback method in the prior art as mentioned above, however, such disadvantages are pointed out that the recording density is not always satisfactorily high and that bit error rate and weather resistance are inferior.

SUMMARY OF THE INVENTION

In consideration of the above-mentioned problems, an object of the present invention is to provide a magnetooptical recording medium having a high recording density, improved bit error rate and superior weather resistance.

Another object of the present invention is to provide a recording and playback method and apparatus preferably applied to the magnetooptical recording medium as described above.

Other objects of the present invention will be apparent from the following description.

According to a first aspect of the present invention, there is provided a magnetooptical recording medium comprising a transparent substrate, and a transparent interference layer, a first magnetooptical layer, a second magnetooptical layer, a third magnetooptical layer and a dielectric protective layer which are laminated in this order on the transparent substrate, wherein data are read out therefrom by irradiating a focused laser beam through the transparent substrate to the first magnetooptical layer while the focused laser beam is relatively moved thereto and by simultaneously applying an external magnetic field.

The first magnetooptical layer has a Curie temperature of about 250° C. or above, exhibits iron series transition metal dominant ferrimagnetism with a low coercive force less than about 0.5 kilo-oersted at a temperature ranging from about 10° C. to about 90° C. and is an amorphous alloy film containing GdFeCo as the main component thereof with a thickness ranging form about 100 angstrom to about 400 angstrom.

The second magnetooptical layer has a Curie temperature ranging from about 110° C. to about 160° C., exhibits iron series transition metal dominant ferrimagnetism at a temperature ranging from about 10° C. to about 90° C., and is an amorphous alloy film containing perpendicularly magnetizable TbFeTi as the main component thereof with a thickness of about 50 angstrom or above.

The third magnetooptical layer has a Curie temperature of about 190° C. or above, exhibits iron series transition metal dominant ferrimagnetism with a high coercive force of about 1.0 kilo-oersted or above at a temperature ranging from about 110° C. to 160° C., and is an amorphous alloy film containing perpendicularly magnetizable TbFeCoTi as the main component thereof with a thickness of about 250 angstrom or above.

The first, second and third magnetooptical layers are exchange-coupled with each other at a temperature ranging from about 10° C. to about 90° C., and the first and third magnetooptical layers are not magnetostatically coupled when the magnetization of the second magnetooptical layer is substantially diminished.

The main components of the second magnetooptical layer and the third magnetooptical layer may be replaced by TbFeCr and TbFeCoCr, TbFeNiCr and TbFeCoNiCr, or TbFeTa and TbFeCoTa. Alternatively, both of the second and third magnetooptical layers may be replaced by a perpendicularly magnetizable amorphous alloy consisting essentially of an iron series transition metal and a rare earth transition metal having respective certain characteristics, and a fourth magnetooptical layer of a certain characteristics is additionally provided between the third magnetooptical layer and the dielectric protective layer.

According to a second aspect of the present invention there is provided a recording and playback method for recording and reproducing data to and from a magnetooptical recording medium of the type as described above, i.e., a magnetooptical recording medium comprising a transparent substrate, and a transparent interference layer, a first magnetooptical layer having a first Curie temperature, a second magnetooptical layer containing a perpendicularly magnetizable amorphous alloy as a main component thereof having a second Curie temperature lower than the first Curie temperature, a third magnetooptical layer containing a perpendicularly magnetizable amorphous alloy as a main component thereof having a third Curie temperature lower than the first Curie temperature and higher than the second Curie temperature, and a dielectric protective layer which are laminated in this order on the substrate, the first magnetooptical layer, second magnetooptical layer and third magnetooptical layer being exchange-coupled at a temperature ranging from about 10° C. to about 90° C., the magnetooptical recording medium additionally having a plurality of test regions each for providing a test signal.

The method including: irradiating a main laser beam through the transparent substrate to a first track of the first magnetooptical layer while moving the main laser beam relatively to the magnetooptical recording medium, the main laser beam having an amount of energy for substantially diminishing magnetization of the second magnetooptical layer in a first portion of a main beam area irradiated by the main laser beam and leaving magnetization of the second magnetooptical layer unchanged in a second portion of the main beam area; irradiating at least one sub-main laser beam through the transparent substrate to a second track of the first magnetooptical layer adjacent to the first track while moving the sub-main laser beam relatively to the magnetooptical recording medium in the direction of the relative movement of the main laser beam simultaneously with the irradiating of the main laser beam, the sub-main laser beam having an amount of energy for substantially diminishing magnetization of the second magnetooptical layer at least in a portion of a sub-main beam area irradiated by the sub-main laser beam, the sub-main beam area being adjacent to the second portion in the direction perpendicular to the relative movement; applying a bias magnetic field to a space including the first magnetooptical layer simultaneously with the irradiating of the main laser beam, thereby deforming magnetization of the first magnetooptical layer in a first portion; and reading out direction of magnetization of the first magnetooptical layer in a region adjacent to the second portion of the second magnetooptical layer.

According to a third aspect of the present invention there is provided a recording and playback apparatus for recording and reproducing data to and from a magnetooptical recording medium of the type as described above, in which test regions are additionally provided for providing test signals, the apparatus comprising: a first laser source for irradiating a main laser beam through the transparent substrate to a first track of the first magnetooptical layer while moving the main laser beam relatively to the magnetooptical recording medium, the main laser beam having an amount of energy for substantially diminishing magnetization of the second magnetooptical layer in a first portion of a main beam area irradiated by the main laser beam and leaving magnetization of the second magnetooptical layer unchanged in a second portion of the main beam area; a second laser source for irradiating at least one sub-main laser beam through the transparent substrate to a second track of the first magnetooptical layer adjacent to the first track while moving the sub-main laser beam relatively to the magnetooptical recording medium in the direction of the relative movement of the main laser beam, the sub-main laser beam having an amount of energy for substantially diminishing magnetization of the second magnetooptical layer at least in a portion of a sub-main beam area irradiated by the sub-main laser beam, the sub-main beam area being adjacent to the second portion in the direction perpendicular to the relative movement; magnetic field providing means for applying a bias magnetic field to a space including the first magnetooptical layer simultaneously with the irradiating of the main laser beam, thereby deforming magnetization of the first magnetooptical layer in the first portion of the main beam area; test signal evaluating means for reading the test signals and calculating a bit error rate by comparing the test signals with a predetermined signal corresponding to the test signals; and power adjusting means for adjusting at least one of the energies of the main and sub-main laser beams and deciding an optimum energy of the laser beams generating a minimum bit error rate.

According to a fourth aspect of the present invention there is provided a recording and playback apparatus for recording and reproducing data to and from a magnetooptical recording medium of the type as described above, the apparatus comprising: a first laser source for irradiating a first laser beam for reading use through the transparent substrate to the magnetooptical layer, the power of the first laser beam being enough for substantially diminishing magnetization of the second magnetooptical layer in a portion of laser beam area irradiated by the first laser beam; first magnetic field providing means for applying a bias magnetic field for reading use to a space including the first magnetooptical layer simultaneously with the irradiating of the first laser beam, thereby deforming the magnetization of the first magnetooptical layer in the portion of the laser beam area; a second laser source, separately from the first laser source, for irradiating a laser beam for writing use; and second magnetic field providing means, separately from the first magnetic field providing means, for applying a bias magnetic field for writing use.

DESCRIPTION OF THE PREFERRED EMBODIMENTS

Preferred embodiments of the present invention will be described below with reference to the drawings.

Figure 1:
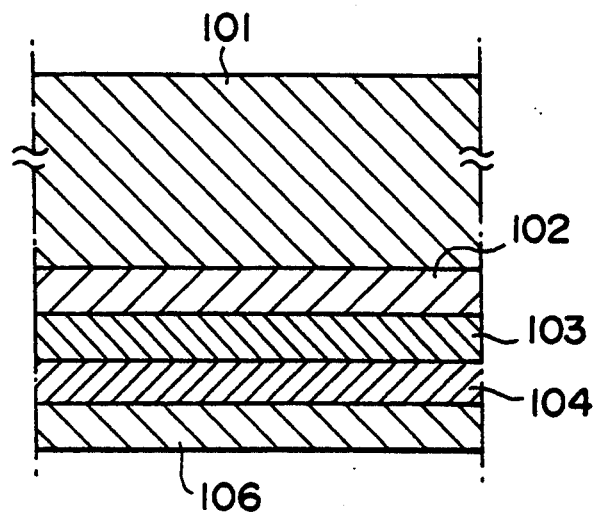
FIG. 1 is an enlarged partial cross-sectional view of a conventional magnetooptical recording medium.
Figure 2:
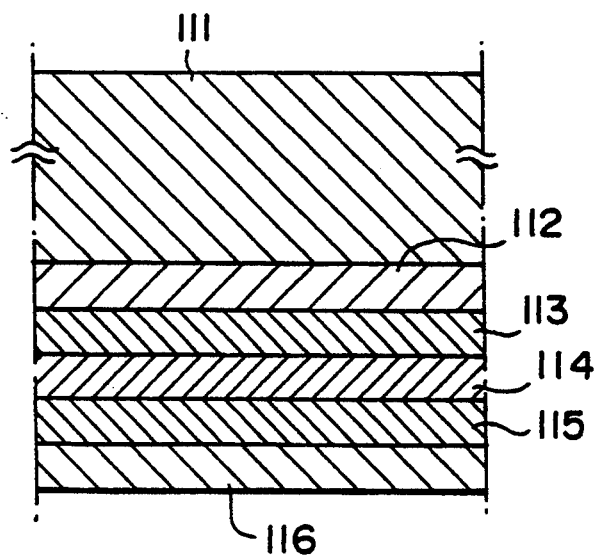
FIG. 2 is an enlarged partial cross-sectional view of another conventional magnetooptical recording medium.
Figure 3:
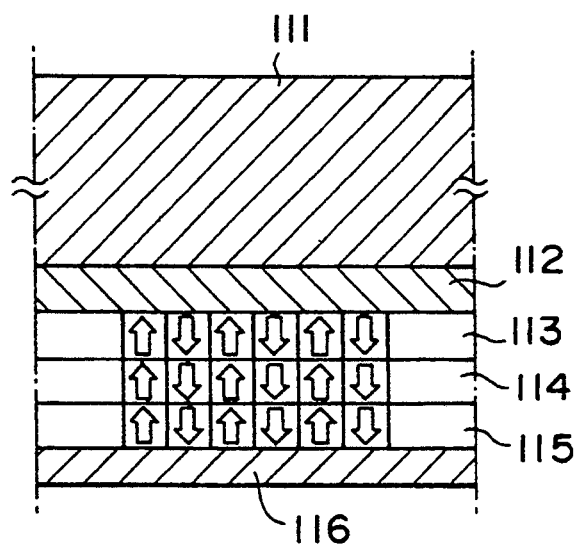
FIG. 3 is an explanatory diagram of a method for deforming a pattern of reverse magnetic domains of the first magnetooptical layer shown in FIG. 2 independently of a pattern of reverse magnetic domains of the third magnetooptical layer by applying an external magnetic field for reading use to thereby obtain a high density reproduction.
Figure 4:
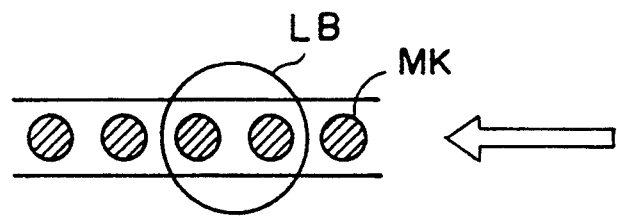
FIG. 4 is an explanatory diagram for a pattern of reverse magnetic domains of the first magnetooptical layer after writing data in the conventional medium shown in FIG. 2.
Figure 5:
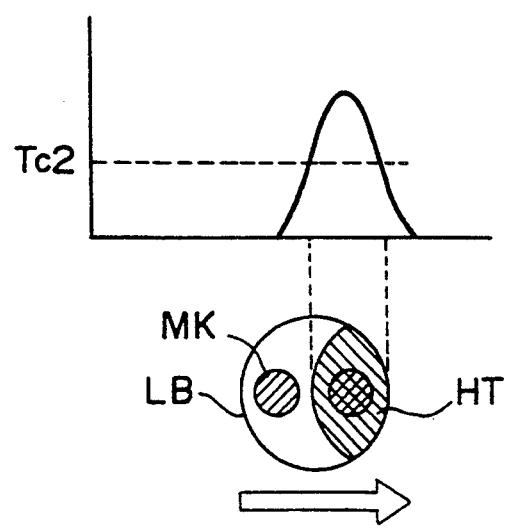
FIG. 5 is an explanatory diagram for a temperature distribution generated by irradiation of a laser beam during read out in the conventional medium shown in FIG. 2.
Figure 6:
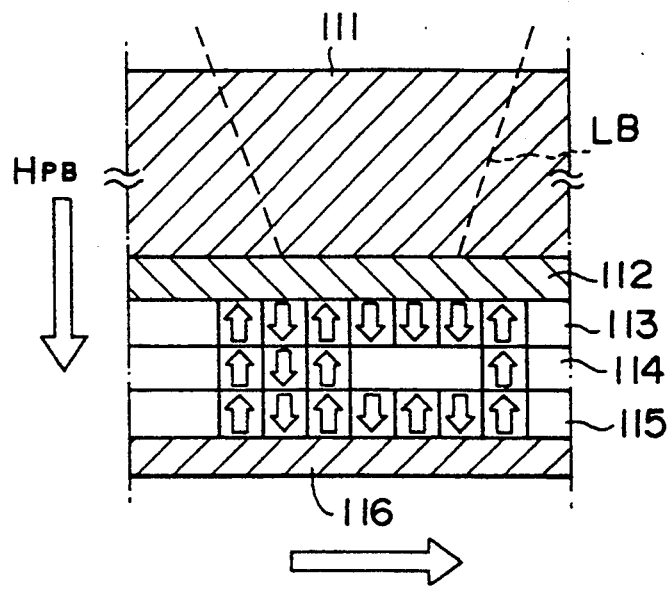
FIG. 6 is a schematic diagram for showing the magnetization state in the conventional medium shown in FIG. 5.
Figure 7:
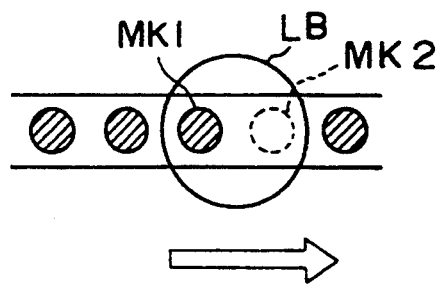
FIG. 7 is an explanatory diagram for a pattern of reverse magnetic domains of the magnetooptical layer during read out in the conventional medium shown in FIG. 2.
Figure 8:
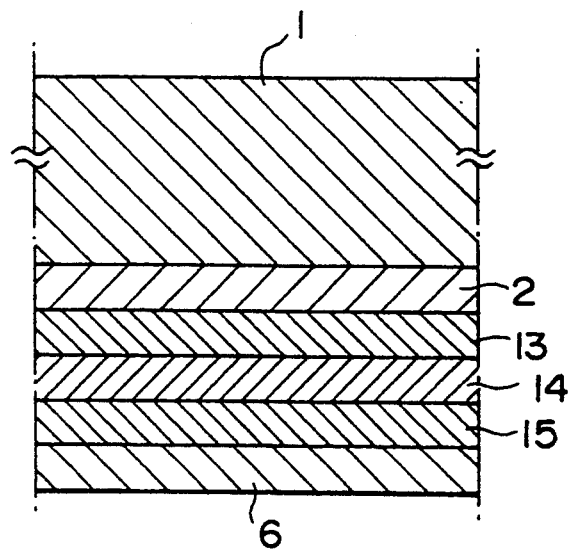
FIG. 8 is an enlarged partial cross-sectional view of a first embodiment of a magnetooptical recording medium according to the present invention.

FIG. 8 is a cross-sectional view of a first embodiment of a magnetooptical recording medium according to the present invention, which comprises a transparent substrate 1, and a transparent interference layer 2, a first magnetooptical layer 13, a second magnetooptical layer 14, a third magnetooptical layer 15 and a dielectric protective layer 6 which are laminated in this order on the substrate 1.

The first magnetooptical layer 13 has a Curie temperature of about 250° C. or above, and exhibits iron series transition metal dominant ferrimagnetism having a low coercive force less than about 0.5 kilo-oersted (kOe) at a temperature of about 10° C. to about 90° C. It is formed of an amorphous alloy containing GdFeCo as the main component thereof with a film thickness ranging from about 100 angstrom to about 400 angstrom.

The second magnetooptical layer 14 has a Curie temperature ranging from about 110° C. to about 160° C., and exhibits iron series transition metal dominant ferrimagnetism at a temperature ranging from about 10° C. to about 90° C. It is formed of an amorphous alloy containing perpendicularly magnetizable TbFeTi as the main component thereof with a film thickness ranging from about 50 angstrom or above.

The third magnetooptical layer 15 has a Curie temperature of about 190° C. or above, and exhibits iron series transition metal dominant ferrimagnetism having a high coercive force of about 1.0 kilo-oersted (kOe) or above at a temperature ranging from about 110° C. to about 160° C. It is formed of an amorphous alloy containing perpendicularly magnetizable TbFeCoTi as the main component thereof with a film thickness of about 250 angstrom.

Besides, the first magnetooptical layer 13, second magnetooptical layer 14 and third magnetooptical layer 15 are formed so as to be exchange-coupled at a temperature ranging from about 10° C. to about 90° C. In addition, the first magnetooptical layer 13 and third magnetooptical layer 15 are formed so as not to be magnetostatically coupled at the temperature at which the magnetization of the second magnetooptical layer 14 is substantially diminished.

The magnetooptical recording medium may be formed as shown in FIG. 8, or may have a protective layer of an ultra violet (UV) cured resin additionally formed on the dielectric protective layer 6 thereof, wherein a laser beam is applied through the transparent substrate 1 thereto to read out data. In addition, it is acceptable that two magnetooptical recording media are prepared as described above, then, applied hot melt adhesives respectively onto the UV cured resin protective layers, and thereafter adhered to each other with the transparent substrates outside, thereby enabling reproducing data therefrom.

To fabricate a magnetooptical recording medium having a further improved reliability, a transparent backcoat layer made, for example, of $S_iO_2$ may be sometimes formed on the surface of the transparent substrate 1 opposite to the transparent interference layer 2.

The transparent substrate 1, may be made of a polycarbonate resin board, a glass board with a photopolymer, or an acrylic resin board with a photopolymer. The transparent substrate 1 is preferable to have guide grooves or guide pits for tracking servo use formed thereinto. The track pitch ranges from about 0.8 μm to about 1.6 μm. The transparent interference layer 2 is particularly preferable to be made of silicon nitride or silicon carbide hydride. In addition, the dielectric protective layer 6 is particularly preferably made of silicon nitride or silicon carbide hydride.

The laser beam for writing or reading use is incident through the transparent substrate 1 to the magnetooptical recording medium to be focused by a focusing servo mechanism so as to have a diameter of approximately 1.0 μm to 1.4 μm in the vicinity from the first magnetooptical layer 13 to the third magnetooptical layer 15. In this case, as to the laser source, a semiconductor laser is used in general, the waveform of the beam of which ranges from about 6700 angstrom to about 8300 angstrom.

Data are written by irradiating and focusing a laser beam of a high energy or power through the transparent substrate 1 onto the first magnetooptical layer 13. By applying the laser beam thereto, the energy of the laser beam is absorbed by at least the first magnetooptical layer 13 to be converted into thermal energy, whereby the third magnetooptical layer 15 is heated up to the vicinity of its Curie temperature. Under this condition, a recording bias magnetic field is applied to the region including this heated area to thereby write the data to be recorded. When the temperature is decreased after the application of the high power laser beam, the reverse magnetic domains written into the third magnetooptical layer 15 are transferred through the second magnetooptical layer 14 to the first magnetooptical layer 13.

On the other hand, the recorded data are read out by effecting the magnetooptical effect of optical rotatory power or circular dichroism after allowing the pattern of the reverse magnetic domains written into the third magnetooptical layer 15 to be deformed in the first magnetooptical layer 15 by utilizing the temperature rise of the second magnetooptical layer 14 through the application of high power laser beam for reading use.

We prepared various types of the magnetooptical recording medium such as described above, and carried out various experiments on them, through which we were able to find out the optimum combinations of the materials of the first, second and third magnetooptical layers and optimum film characteristics thereof, and to obtain a high recording density, improved bit error rate and superior storage characteristics at a high temperature and humidity.

As to the first magnetooptical layer 13, it was revealed that the Curie temperature thereof is necessary to be 250° C. or above in order to increase θk for reading. Besides, it was found that in case that the coercive force thereof is not set to a low value smaller than about 0.5 kilo-oersted at a temperature ranging from about 10° C. to about 90° C., the pattern of the reverse magnetic domains written into the third magnetooptical layer 15 cannot be transferred satisfactorily. In such case, the magnetooptical recording medium is deteriorated in bit error rate, as a result of which it is impossible to make a practical recording medium. In order to reduce noises after recording and to achieve superior transfer, it is preferable to use an amorphous alloy containing GdFeCo exhibiting iron series transition metal dominant ferrimagnetism as the main component thereof.

If the thickness of the first magnetooptical layer 13 is less than about 100 angstrom, the signal amplitude obtained by reproduction became small, as a result of which it is impossible to be practically realizable. On the other hand, if it was larger than 400 angstrom, preferable shape of the reverse magnetic domains could not be formed, so that the carrier-to-noise ratio (C/N) was deteriorated, revealing that it is impossible to be practically realizable. Furthermore, in order to form satisfactory shape of reverse magnetic domains, it was recognized that the GdFeCo film itself should not be perpendicularly magnetizable but be intra-surface-magnetizable.

As to the second magnetooptical layer 14, it was found that the Curie temperature of the second magnetooptical layer 14 must be within the range from about 110° C. to about 160° C. in order to make the pattern of the reverse magnetic domains written in the third magnetooptical layer 15, the pattern being deformable by the first magnetooptical layer 13 through applying a laser beam of a comparatively low power for reading use. In order that the pattern of the reverse magnetic domains written in the magnetooptical layer 15 is transferred satisfactorily to the first magnetooptical layer 13 and that the magnetooptical recording medium is made superior in storage characteristic at a high temperature and humidity, it was found that the film is made preferably of an amorphous alloy containing TbFeTi as the main component thereof, exhibiting iron series transition metal dominant ferrimagnetism at a temperature ranging from about 10° C. to about 90° C. and being perpendicularly magnetizable.

It was found that if the film thickness of the second magnetooptical layer 14 is less than about 50 angstrom, when the magnetization of the second magnetooptical layer 14 is substantially diminished through applying a laser beam power for reading use, adverse effects may be exercised on the deformation of the pattern of the reverse magnetic domains of the first magnetooptical layer 13 because the pattern of tile reverse magnetic domains written in the third magnetooptical layer 15 is magnetostatically coupled. As a result the bit error rate will be deteriorated and the recording medium may be impossible to be practically realizable.

We examined on the various materials of the third magnetooptical layer 15 in order to find out the conditions that the pattern of the reverse magnetic domains written thereinto is not allowed to be deformed by applying a laser beam power for reading use, that the written pattern of the reverse magnetic domains becomes superior, that the pattern of the reverse magnetic domains written into the third magnetooptical layer 15 is satisfactorily transferred to the first magnetooptical layer 13, and that the magnetooptical recording medium is made superior in storage characteristic at a high temperature and humidity.

Thus, it was found that it is preferable that the third magnetooptical layer 15 has a Curie temperature of about 190° C. or above, exhibits iron series transition metal dominant ferrimagnetism having a high coercive force of about 1.0 kilo-oersted or above at a temperature ranging from about 110° C. to about 160° C., and is made of an amorphous alloy containing perpendicularly magnetizable TbFeCoTi as the main component thereof. It was found that the film thickness thereof should be about 250 angstrom or above in order to keep a satisfactory bit error rate.

In order to obtain an improved signal quality, it was found that the first magnetooptical layer 13, second magnetooptical layer 14 and third magnetooptical layer 15 should be exchange-coupled at a temperature ranging from about 10° C. to about 90° C.

Now, description will be made below on the first embodiment of the magnetooptical recording medium according to the present invention with reference to FIG. 8. The magnetooptical recording medium is formed as described below.

First, the disk-shaped transparent substrate 1 of polycarbonate resin with a diameter of 130 mm and a thickness of 1.2 mm having guide grooves thereon was applied with a hard coat process onto the surface opposite to the surface on which the guide grooves are formed, then, disposed within a sputterring chamber, and the chamber was evacuated up to a vacuum degree of less than $3 \times 10^{-7}$ Torr. Thereafter, the surface having the guide grooves formed thereinto was subjected to etchback sputterring by about 5 angstrom under an argon gas, following which a silicon target was sputtered thereto under a mixing gas of argon and nitrogen. Thus, the transparent interference layer 2 with a film thickness of 820 angstrom is obtained.

Next, a GdFeCo target (Gd:Fe:Co=20.5:65.0:14.5 atomic %) is sputtered under an argon gas to form the first magnetooptical layer 3 of amorphous GdFeCo with a film thickness of 300 angstrom. Subsequently, a TbFeTi target (Tb:Fe:Ti=18.6:79.4:2.0 atomic %) is sputtered under an argon gas to form the second magnetooptical layer 14 of amorphous TbFeTi with a film thickness of 100 angstrom. Then, a TbFeCoTi target (Tb:Fe:Co:Ti=21.8:57.2:18.0:3.0 atomic %) is sputtered under an argon gas to form the third magnetooptical layer 15 of amorphous TbFeCoTi with a film thickness of 400 angstrom.

Then, the silicon target is sputtered under a mixing gas of argon and nitrogen on the outside surface of the third magnetooptical layer 15 to form the dielectric protective layer 6 of silicon nitride with a film thickness of 820 angstrom. Thus, the first embodiment of the magnetooptical recording medium as shown in FIG. 8 is obtained. Subsequently, it is removed from the sputterring system and then, an UV curable resin is spincoated on the dielectric protective layer 6, followed by applying UV irradiation to form a protective film of UV cured resin with a film thickness of 10 μm. Two disk-shaped optical magnetooptical media as described above were prepared, and adhered to each other by applying hot melt adhesives respectively onto the UV cured resin protective layers to thereby reinforce its mechanical strength, thus obtaining a final magnetooptical recording medium of this embodiment.

While the magnetooptical recording medium thus obtained was rotated at 3600 rpm, a semiconductor laser beam with a wavelength of 8300 angstrom was applied through the transparent substrate 1 thereto, the laser beam being focused in a beam diameter of about 1.4 μm on the first magnetooptical layer 13 by using an objective lens having a numerical aperture of 0.55. A signal with a recording frequency of 10 MHz was recorded at a position 30 mm apart from the center of the recording medium by an optical modulation method with a duty ratio set at 50% by adopting a recording power of 9 mW and the recording bias magnetic field of 300 oersted. Then, using the same recording head, the recorded signal was reproduced by using the energy of a 2.8 mW power of a laser beam for reading use and the external magnetic field of 500 oersted for reading use, thereby successfully obtaining a high C/N ratio of 47 dB. For the sake of comparison, the signal was reproduced without application of the external magnetic field for reading use, which resulted in a low C/N ratio of 42 dB.

From the results obtained as above, it was confirmed that even though the reverse magnetic domain pitch is as high as 1.13 μm in density, the magnetooptical recording medium and its recording and playback method are capable of providing high quality signals. Besides, the measurements of bit error rate revealed that it is enough low to be practically realizable.

Even after the magnetooptical recording medium obtained as described above are stored for 200 hours at 80 and 80% relative humidity, no problem had arisen on the recording and reproduction characteristics, thus making sure that the magnetooptical recording medium and its recording and playback method according to the embodiment are practically realizable.

In the case that the second magnetooptical layer 14 was made of TbFe, and the third magnetooptical layer 15 was made of TbFeCo as in the prior art, the storing characteristic at a high temperature and humidity was not satisfactory. The bit error rate was not satisfactory as well when high density recording and reproducing are executed. The reason therefor is not clear, but it is considered due to the fact that the reverse magnetic domains cannot be shaped satisfactorily because the magnetic balance of these three magnetooptical layers is not appropriate when the reverse magnetic domains are written at a high density.

Figure 9:
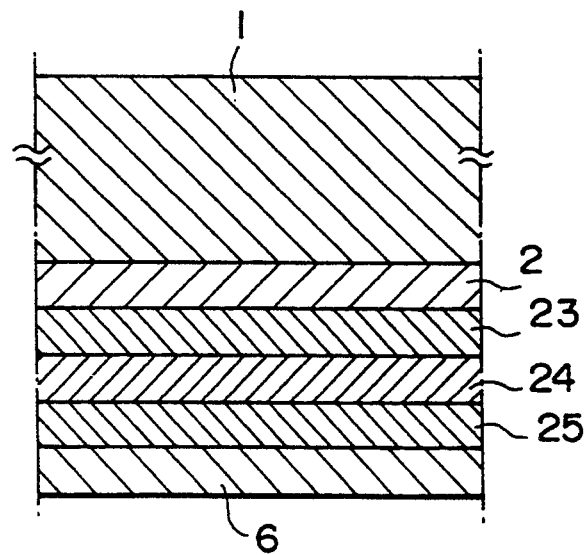
FIG. 9 is an enlarged partial cross-sectional view of a second embodiment of a magnetooptical recording medium according to the present invention.

FIG. 9 is a cross-sectional view of a magnetooptical recording medium according to a second embodiment of the present invention, which is similar to the first embodiment in that a first magnetooptical layer 23 is made of GdFeCo, but is different from the first embodiment in that a second magnetooptical layer 24 is made of TbFeCr and a third magnetooptical layer 25 is made of TbFeCoCr.

The first magnetooptical layer 23 has a Curie temperature of about 250° C. or above, and exhibits iron series transition metal dominant ferrimagnetism having a low coercive force less than 0.5 kilo-oersted at a temperature ranging from about 10° C. to about 90° C. It is formed of an amorphous alloy with a film thickness ranging from about 100 angstrom to about 400 angstrom.

The second magnetooptical layer 24 has a Curie temperature ranging from about 110° C. to about 160 ° C., and exhibits iron series transition metal dominant ferrimagnetism at a temperature ranging from about 10° C. to about 90° C . It is formed of a perpendicularly magnetizable amorphous alloy with a film thickness of about 50 angstrom or above.

The third magnetooptical layer 25 has a Curie temperature of about 190° C. or above, and exhibits iron series transition metal dominant ferrimagnetism having a high coercive force of about 1.0 kilo-oersted or above at a temperature of about 110° C. to about 160° C. It is formed of a perpendicularly magnetizable amorphous alloy with a film thickness of about 250 angstrom or above.

Besides, the first magnetooptical layer 23, second magnetooptical layer 24 and third magnetooptical layer 25 are formed so as to be exchange-coupled at a temperature of about 10° C. to about 90° C. The first magnetooptical layer 23 and third magnetooptical layer 25 are formed so as not to be magnetostatically coupled in the external magnetic field for reading use at the temperature at which the magnetization of the first magnetooptical layer 24 is substantially diminished. In other aspects, it is the same as in the first embodiment.

Figure 10:
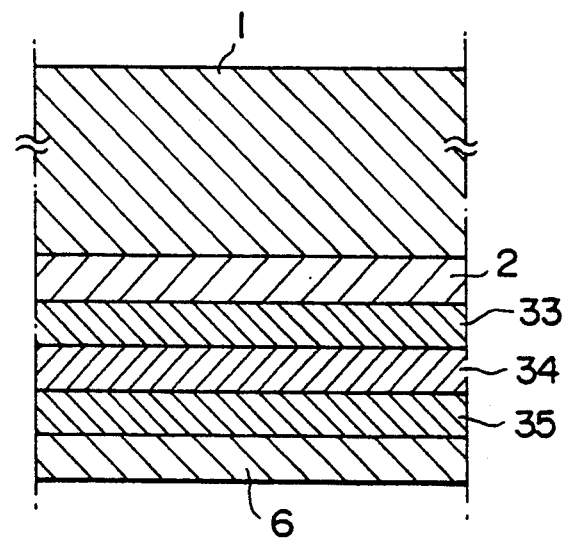
FIG. 10 is an enlarged partial cross-sectional view of a third embodiment of a magnetooptical recording medium according to the present invention.

FIG. 10 is a cross-sectional view of a magnetooptical recording medium according to a third embodiment of the present invention, which is similar to the first embodiment shown in FIG. 8 in that a first magnetooptical layer 33 is made of GdFeCo, but is different from the first embodiment in that a second magnetooptical layer 34 is made of TbFeNiCr and a third magnetooptical layer 35 is made of TbFeCoNiCr.

The first magnetooptical layer 33 has a Curie temperature of about 250° C. or above, and exhibits iron series transition metal dominant ferrimagnetism having a low coercive force less than 0.5 kilo-oersted at a temperature of 10° to 90° C. It is formed of an amorphous alloy with a film thickness ranging from about 100 to 400 angstrom.

The second magnetooptical layer 34 has a Curie temperature ranging from about 110° C. to 160° C., and exhibits iron series transition metal dominant ferrimagnetism at a temperature of 10° to 90° C. It is formed of a perpendicularly magnetizable amorphous alloy with a film thickness of about 50 angstrom or above.

The third magnetooptical layer 35 has a Curie temperature of about 190° C. or above, and exhibits iron series transition metal dominant ferrimagnetism having a high coercive force of 1.0 kilo-oersted or above at a temperature of 110° C. to about about 160° C. It is formed of a perpendicularly magnetizable amorphous alloy with a film thickness of about 250 angstrom or above.

Besides, the first magnetooptical layer 33, second magnetooptical layer 34 and third magnetooptical layer 35 are formed so as to be exchange-coupled at a temperature of about 10° C. to about 90° C. The first magnetooptical layer 33 and third magnetooptical layer 35 are formed so as not to be magnetostatically coupled in the external magnetic field for reading use at the temperature at which the magnetism of the second magnetooptical layer 34 is substantially diminished. In other aspects, it is the same as in the first embodiment shown in FIG. 8.

Figure 11:
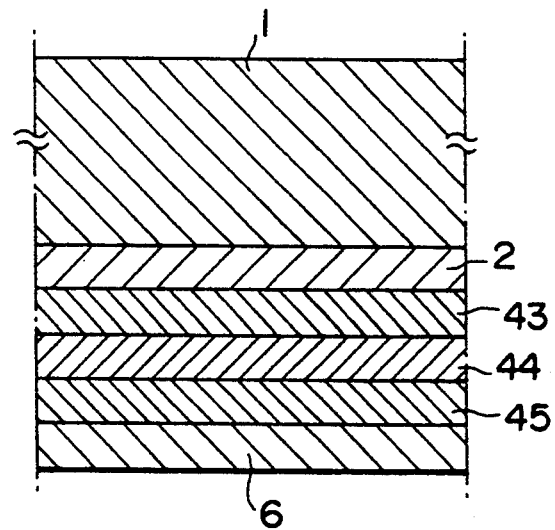
FIG. 11 is an enlarged partial cross-sectional view of a fourth embodiment of a magnetooptical recording medium according to the present invention.

FIG. 11 is a cross-sectional view of a fourth embodiment of a magnetooptical recording medium according to the present invention, which is similar to the first embodiment shown in FIG. 8 in that a first magnetooptical layer is made of GdFeCo, but is different from the first embodiment in that a second magnetooptical layer 44 is made of TbFeTa, and a third magnetooptical layer 45 is made of TbFeCoTa.

The first magnetooptical layer 43 has a Curie temperature of about 250° C. or above, and exhibits iron series transition metal dominant ferrimagnetism having a low coercive force less than about 0.5 kilo-oersted at a temperature ranging from about 10° to 90° C. It is formed of an amorphous alloy with a film thickness ranging from about 100 angstrom to about 400 angstrom.

The second magnetooptical layer 44 has a Curie temperature ranging from about 110° C. to about 160° C., and exhibits iron series transition metal dominant ferrimagnetism at a temperature ranging from about 10° C. to about 90° C. It is formed of a perpendicularly magnetizable amorphous alloy with a film thickness of about 50 angstrom or above.

The third magnetooptical layer 45 has a Curie temperature of about 190° C. or above, and exhibits iron series transition metal dominant ferrimagnetism having a high coercive force of about 1.0 kilo-oersted or above at a temperature ranging from about 10° C. to about 90° C. It is formed of a perpendicularly magnetizable amorphous alloy with a film thickness of about 250 angstrom or above.

The first magnetooptical layer 43, second magnetooptical layer 44 and third magnetooptical layer 45 are formed so as to be exchange-coupled at a temperature ranging from about 10° C. to about 90° C. The first magnetooptical layer 43 and third magnetooptical layer 45 are formed so as not to be magnetostatically coupled in the external magnetic field for reading use at the temperature at which the magnetization of the second magnetooptical layer 44 is substantially diminished. In other aspects, it is the same as in the first embodiment shown in FIG. 8.

Figure 12:
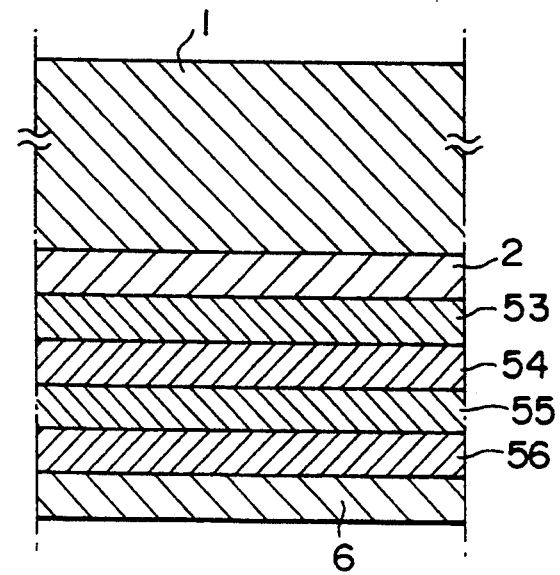
FIG. 12 is an enlarged partial cross-sectional view of a fifth embodiment of a magnetooptical recording medium according to the present invention.

FIG. 12 is a cross-sectional view of a fifth embodiment of a magnetooptical recording medium according to the present invention, which is different from the first embodiment shown in FIG. 8 in that the magnetooptical recording medium of this embodiment has four magnetooptical layers consisting of a first magnetooptical layer 53, a second magnetooptical layer 54, a third magnetooptical layer 55 and a fourth magnetooptical layer 56. The first magnetooptical layer 53 has a Curie temperature of about 250° C. or above, and exhibits iron series transition metal dominant ferrimagnetism having a low coercive force less than about 0.5 kilo-oersted at a temperature ranging from about 10° C. to about 90° C. It is formed of an amorphous alloy consisting essentially of iron series transition metal and rare earth transition metal with a film thickness ranging from about 100 angstrom to about 400 angstrom.

The second magnetooptical layer 54 has a Curie temperature ranging from about 110° C. to about 160° C., and exhibits iron series transition metal dominant ferrimagnetism at a temperature ranging from about 10° C. to about 90° C. It is formed of an amorphous alloy of perpendicularly magnetizable iron series transition metal and rare earth transition metal with a film thickness of 50 angstrom or above.

The third magnetooptical layer 55 has a Curie temperature of about 190° C. or above, and exhibits iron series transition metal dominant ferrimagnetism having a high coercive force of 1.0 kilo-oersted or above at a temperature ranging from about 110° C. to about 160° C. It is formed of an amorphous alloy consisting essentially of perpendicularly magnetizable iron series transition metal and rare earth transition metal with a film thickness of about 250 angstrom or above.

The fourth magnetooptical layer 56 has a Curie temperature of about 250° C. or above, and exhibits iron series transition metal dominant ferrimagnetism having a low coercive force lower than about 0.5 kilo-oersted at a temperature ranging from about 10° C. to about 90° C. It is formed of a substantially intra-surface-magnetizable amorphous alloy containing GdFeCo as the main component thereof.

Besides, the first magnetooptical layer 53, second magnetooptical layer 54 and third magnetooptical 55 are formed so as to be exchange-coupled at a temperature ranging from about 10° C. to about 90° C. The first magnetooptical layer 53 and third magnetooptical layer 54 are formed so as not to be magnetostatically coupled in the external magnetic field for reading use at the temperature at which the magnetization of the second magnetooptical layer 54 is substantially diminished.

Such a signal recording method using an optical modulation method may be applied to the magnetooptical recording medium of this embodiment which is described together with the first embodiment of the magnetooptical recording medium shown in FIG. 8. It is preferable, however, to adopt-a magnetic field modulation method in this embodiment from the viewpoint of high density recording. With the magnetic field modulation method, when a focused laser beam for writing use is incident through the transparent substrate 1 to the first magnetooptical layer 53, the third magnetooptical layer 55 is heated up to the vicinity of the Curie point. A magnetic field of polarity corresponding to data to be transferred is applied to the region including the heated area, thereby forming the pattern of the reverse magnetic domains corresponding to the data. The method is disclosed in the Japanese Patent Laid-Open Publication NO. 60-48806, the entire content of which is incorporated herein by reference.

With the magnetooptical recording medium shown in FIG. 12, the magnetic field modulation recording as mentioned above and a high density reproduction by deforming in the first magnetooptical layer 53 the pattern of the reverse magnetic domains written into the third magnetooptical layer 55 can be compatible with each other. The reason for this is not clear, but it is considered to result from the fact that an intra-surface-magnetizable GdFeCo layer with a small saturation magnetization is introduced as the fourth magnetooptical layer 56.

Next, another embodiment of a recording and playback method of a magnetooptical recording medium of the present invention will be described below with reference to FIG. 13.

Figure 13:
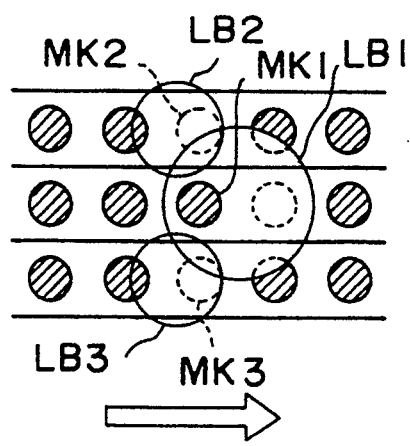
FIG. 13 is an explanatory diagram for an embodiment of a recording and playback method according to the present invention applied to a magnetooptical recording medium of the present invention.

FIG. 13 is an enlarged partial top plan view of a magnetooptical recording medium as observed from the transparent substrate side, showing the recording and playback method applied to a magnetooptical recording medium of the present invention. As to the magnetooptical recording medium to be used in this embodiment, any of those shown in FIG. 8 to FIG. 12 may be employed.

In FIG. 13, only three tracks are shown as the data tracks for the sake of convenience. The central track is the one from which the data is read out, and on which a beam LB1 as the main laser beam is relatively moved. Laser beams LB2, LB3 as the sub-main laser beams are relatively moved to the recording medium on the adjacent tracks, respectively. Here, the positional relationship of the main laser beam LB1 and the sub-main laser beams LB2, LB3 is such that the submain laser beams LB2 and LB3 respectively mask the reverse magnetic domains MK2 and MK3 adjacent to the reverse magnetic domain MK1 in the direction perpendicular to the moving direction, the reverse magnetic domain MK1 being a trailing region of the main beam region irradiated by the main laser beam LB1 from which data is read. Thus, the magnetization of the reverse magnetic domain MK1 is readily distinguished from those of the domains MK2 and MK3. Accordingly, high density recording and reproduction of data can be performed even in the direction perpendicular to the moving direction (direction of data track).

Figure 14:
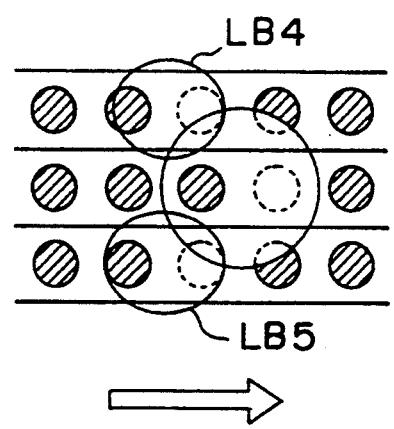
FIG. 14 is an explanatory diagram for another embodiment of a recording and playback method according to the present invention applied to a magnetooptical recording medium of the present invention.

FIG. 14 shows further another embodiment of a recording and playback method according to the present invention applied to a magnetooptical recording medium of the present invention, which is different from the method shown in FIG. 13 in that laser beams LB4, LB5 as the submain laser beams are focused into an ellipse having its minor axis in the direction perpendicular to the direction of the relative movement. As a result, the method of this embodiment can provide a higher density reading in the direction perpendicular to the moving direction (direction of data track) than the method shown in FIG. 13.

Figure 15:
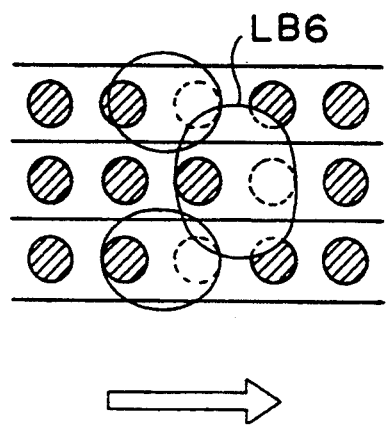
FIG. 15 is an explanatory diagram for further another embodiment of a recording and playback method according to the present invention applied to a magnetooptical recording medium of the present invention.

FIG. 15 shows a still another embodiment of a recording and playback method according to the present invention applied to a magnetooptical recording medium of the present invention, which is different from the method shown in FIG. 13 in that a laser beam LB6 as the main laser beam is focused into an ellipse having its minor axis in the direction of relative movement. As a result, the method of this embodiment can provide a higher density reading in the direction of relative movement (direction of data track) than the method shown in FIG. 13.

Now, an embodiment of a magnetooptical recording and playback apparatus according to the present invention will be described. As to the magnetooptical recording medium, any of those shown in FIG. 8 to FIG. 12 may be employed. Data may be written, as described before, by optical modulation or magnetic field modulation. On the other hand, the data are read out therefrom as described below.

While irradiating through the transparent substrate a focused laser beam for reading use to the first magnetooptical layer during relative movement, the magnetization of the second magnetooptical layer is made so as to be substantially diminished, as described before. At that time, an external magnetic field is applied, so that the magnetization of the area of the first magnetooptical layer adjacent to the second magnetooptical layer whose magnetization is substantially diminished is changed to follow the direction of the external magnetic field. As a result, the signal reproduction can be performed while the pattern of the reverse magnetic domains of the first magnetooptical layer is deformed so as to be different from the pattern of the reverse magnetic domains of the third magnetooptical layer.

In order to perform such a signal reproduction at a low bit error rate, it is preferable that the laser beam power for reading use is appropriately changed depending on the position of the transparent substrate where the laser beam is irradiated, thereby making sure that the pattern of the reverse magnetic domains of the first magnetooptical layer is appropriately deformed from the pattern of the reverse magnetic domains of the third magnetooptical layer.

Various methods are known in order to change appropriately the laser beam power for reading use depending on the reading position of the transparent substrate. In case that the magnetooptical recording medium is disk-shaped and the recording and reproduction of data are carried out while rotating it at a constant angular velocity (CAV), the relative velocity between the magnetooptical layer and the laser beam for reading use depends on the radial position of the magnetooptical layer at which the read-out is executed.

In case that each layer of the magnetooptical recording medium is uniform in the radial direction and the laser beam for reading use is constant in power, the temperature of the second magnetooptical layer during irradiation of the laser beam is decreased as the laser beam moves towards the peripheral portion of the magnetooptical recording medium in the radial direction. If the temperature is decreased in the second magnetooptical layer, the magnetization of the second magnetooptical layer cannot be diminished, so that the pattern of the reverse magnetic domains of the first magnetooptical layer is not deformed by the external magnetic field for reading use independently of the pattern of the reverse magnetic domains of the third magnetooptical layer. Therefor, it is preferable that the laser beam is increased in power as the readout is executed at the peripheral position in the radial direction.

Now, another embodiment of a magnetooptical recording and playback apparatus according to the present invention will be described.

With the magnetooptical recording and playback apparatus of the present invention, the pattern of the reverse magnetic domains of the first magnetooptical layer is deformed by the external magnetic field for reading use independently of the pattern of the reverse magnetic domains of the third magnetooptical layer, thus providing higher density reproduction. In order to obtain a low bit error rate through the apparatus of this type, such a construction is preferably adopted that plural test regions are installed on the magnetooptical recording medium for providing test signals of a certain predetermined data, which are reproduced with the laser beam power for reading use as a parameter. The test signals reproduced are compared with the predetermined data to calculate a bit error rate. The laser beam power is adjusted so as to generate a minimum bit error rate. The readout of the test signals and adjustments of the laser beam are repeated at the same test region by changing the laser beam power for reading use, through which the beam power providing smallest number of errors is determined to be used in the subsequent reproductions.

By introducing such method of reproduction, the data can be read out at the optimum laser beam power for reading use when the apparatus is first introduced in operation or the recording medium is substituted, or when a minimum signal change with time lapse is required. Such tests can be carried out at different positions on the substrate to determine the optimum laser beam powers for reading use at respective positions, so that in the subsequent reproductions, the data are read out in response to the respective optimum laser beam powers determined by estimating the optimum laser beam powers depending on such different positions. Thus, the data can be read out at a low bit error rate over the whole region of the recording medium.

Figure 16:
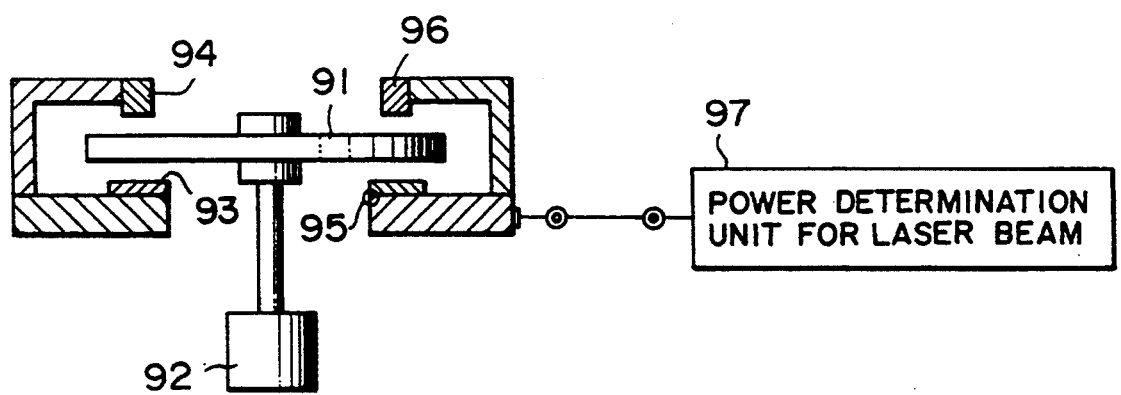
FIG. 16 is a schematic cross-sectional view of an embodiment of a magnetooptical recording and playback apparatus according the present invention.

Next, a still another embodiment of a magnetooptical recording and playback apparatus of the present invention will be described with reference to FIG. 16. FIG. 16 shows a magnetooptical recording and playback apparatus of this embodiment, which has a magnetooptical recording medium 91 (magnetooptical disk) on a circular plate rotated by a motor 92. The magnetooptical recording medium 91 is separately equipped with a laser beam irradiation unit for writing use and a laser beam irradiation unit for reading use. The laser beam irradiation unit for writing use comprises an optical head 93 and an electromagnet 94 both for recording use.

In addition, the laser beam irradiation unit for reading use in this embodiment comprises an optical head 95 and a permanent magnet 96 both for reproducing use. Since the magnet for recording use of the laser beam irradiation unit for writing use is used to reverse the direction of magnetic domains, the electromagnet 94, which can generate an alternating magnetic field, is preferably employed. In FIG. 16, the reference numeral 97 denotes a power determination unit for laser beam.

The pattern of the reverse magnetic domains of the first magnetooptical layer are independently deformed from the pattern of the reverse magnetic domains of the third magnetooptical layer by the external magnetic field for reading use, thus providing a high density reproduction. With the magnetooptical recording and playback apparatus of this embodiment, the data can be read out at a higher density by using the recording optical head 93 and recording electromagnet 94.

A conventional magnetooptical recording apparatus causes a deterioration in bit error rate when signals are reproduced for a long period of time. The reason for this could be found through repetition of various tests, which showed that the pattern of the reverse magnetic domains of the third magnetooptical layer cannot be deformed satisfactorily in the first magnetooptical layer at the laser beam powers for reading use since the temperature is increased in the vicinity of the magnetooptical recording medium during reproducing data for a long period of time. The temperature rise in the vicinity of the magnetooptical recording medium was found to result from the heat generation of the electromagnet 94. This problem could be solved by appropriately providing the optical head 95 for reproducing use and the permanent magnet 96 for reproducing use separately in the laser beam irradiation unit for reading use and by applying the magnetic field for reproducing use through a permanent magnet.

Since above embodiments are described only for examples, the present invention is not limited to such embodiments and it will be obvious for those skilled in the art that various modifications or alterations can be easily made based on the above embodiments under the scope of the present invention.

What is claimed is:

1. A magneto-optical recording medium comprising:
   a transparent substrate;
   a transparent interference layer formed on said transparent substrate;
   a first magneto-optical layer formed on said transparent interference layer, said first magnetooptical layer having a Curie temperature not lower than approximately 250° C., exhibiting iron series transition metal dominant ferrimagnetism with a coercive force lower than approximately 0.5 kilo-oersted at a temperature ranging from approximately 10° C. to approximately 90° C., and being an amorphous alloy film containing GdFeCo as the main component thereof with a thickness ranging from 100 angstrom to 400 angstrom;
   a second magneto-optical layer formed on said first magneto-optical layer, said second magneto-optical layer having a Curie temperature ranging from approximately 110° C. to approximately 160° C., exhibiting ion series transition metal dominant ferrimagnetism at a temperature ranging from approximately 10° C. to approximately 90° C., and being an amorphous alloy film containing perpendicularly magnetizable TbFeTi as the main component thereof with a thickness not lower than approximately 50 angstrom;
   a third magneto-optical layer formed on said second magneto-optical layer, said third magneto-optical layer having a Curie temperature not lower than approximately 190° C., exhibiting iron series transition metal dominant ferrimagnetism with a coercive force not lower than approximately 1.0 kilo-oersted at a temperature ranging from approximately 110° C. to approximately 160° C., and being an amorphous alloy film containing perpendicularly magnetizable TbFeCoTi as the main component thereof with a thickness not lower than approximately 250 angstrom; and
   a dielectric protective layer formed on said third magneto-optical layer,
   said first magneto-optical layer, said second magneto-optical layer and said third magneto-optical layer being exchange-coupled at a temperature ranging from approximately 10° C. to approximately 90° C.,
   said first magneto-optical layer and said third magneto-optical layer being not magnetostatically coupled in an external magnetic field for reading use at a temperature at which magnetization of said second magneto-optical layer is substantially diminished, said external magnetic field being applied to said magneto-optical recording medium while a laser beam for reading use is moved relatively to said magneto-optical recording medium and irradiated through said transparent substrate to said first magneto-optical layer.

2. A magneto-optical recording medium comprising:
a transparent substrate;
a transparent interference layer formed on said transparent substrate;
a first magneto-optical layer formed on said transparent interference layer, said first magneto-optical layer having a Curie temperature not lower than approximately 250° C., exhibiting iron series transition metal dominant ferrimagnetism with a coercive force lower than 0.5 kilo-oersted at a temperature ranging from approximately 10° C. to approximately 90° C., and being an amorphous alloy film containing GdFeCo as the main component thereof with a thickness ranging from approximately 100 angstrom to approximately 400 angstrom;
a second magneto-optical layer formed on said first magneto-optical layer, said second magneto-optical layer having a Curie temperature ranging from approximately 110° C. to approximately 160° C., exhibiting iron series transition metal dominant ferrimagnetism at a temperature ranging from approximately 10° C. to approximately 90° C., and being an amorphous alloy film containing perpendicularly magnetizable TbFeCr as the main component thereof with a thickness not lower than approximately 50 angstrom;
a third magneto-optical layer formed on said second magneto-optical layer, said third magneto-optical layer having a Curie temperature not lower than approximately 190° C., exhibiting iron series transition metal dominant ferrimagnetism with a coercive force not lower than approximately 1.0 kilo-oersted at a temperature ranging from approximately 110° C. to approximately 160° C., and being an amorphous alloy film containing perpendicularly magnetizable TbFeCoCr as the main component thereof with a thickness not lower than approximately 250 angstrom; and
a dielectric protective layer formed on said third magneto-optical layer,
said first magneto-optical layer, said second magneto-optical layer and said third magneto-optical layer being exchange-coupled at a temperature ranging from approximately 10° C. to approximately 90° C.,
said first magneto-optical layer and said third magneto-optical layer being not magnetostatically coupled in an external magnetic field for reading use at a temperature at which magnetization of said second magneto-optical layer is substantially diminished, said eternal magnetic field being applied to said magneto-optical recording medium while a laser beam for reading use is moved relatively to said magneto-optical recording medium and irradiated through said transparent substrate to said first magneto-optical layer.

3. A magneto-optical recording medium comprising:
a transparent substrate;
a transparent interference layer formed on said transparent substrate;
a first magneto-optical layer formed on said transparent interference layer, said first magnetooptical layer having a Curie temperature not lower than 250° C., exhibiting iron series transition metal dominant ferrimagnetism with a coercive force lower than approximately 0.5 kilo-oersted at a temperature ranging from approximately 10° C. to approximately 90° C., and being an amorphous alloy film containing GdFeCo as the main component thereof with a thickness ranging from approximately 100 angstrom to approximately 200 angstrom;
a second magneto-optical layer formed on said first magneto-optical layer, said second magneto-optical layer having a Curie temperature ranging from approximately 110° C. to approximately 160° C., exhibiting iron series transition metal dominant ferrimagnetism at a temperature ranging from approximately 10° C. to approximately 90° C., and being an amorphous alloy film containing perpendicularly magnetizable TbFeNiCr as the main component thereof with a thickness not lower than 50 angstrom;
a third magnetooptical layer formed on said second magnetooptical layer, said third magnetooptical layer having a Curie temperature not lower than 190° C., exhibiting iron series transition metal dominant ferrimagnetism with a coercive force not lower than about 1.0 kilo-oersted at a temperature ranging from about 110° C. to about 160° C., and being an amorphous alloy film containing perpendicularly magnetizable TbFeCoNiCr as the main component thereof with a thickness not lower than 250 angstrom; and
a dielectric protective layer formed on said third magnetooptical layer,
said first magnetooptical layer, said second magnetooptical layer and said third magnetooptical layer being exchange-coupled at a temperature ranging from about 10° C. to about 90° C., and
said first magnetooptical layer and said third magnetooptical layer being not magnetostatically coupled in an external magnetic field for reading use at a temperature at which magnetization of said second magnetooptical layer is substantially diminished, said external magnetic field being-applied to said magnetooptical recording medium while a laser beam for reading use is moved relatively to said magnetooptical recording medium and irradiated through said transparent substrate to said first magnetooptical layer.

4. A magnetooptical recording medium comprising:
a transparent substrate;
a transparent interference layer formed on said transparent substrate;
a first magnetooptical layer formed on said transparent interference layer, said first magnetooptical layer having a Curie temperature not lower than about 250° C., exhibiting iron series transition metal dominant ferrimagnetism with a coercive force lower than 0.5 kilo-oersted at a temperature ranging from about 10° C. to about 90° C., and being an amorphous alloy film containing GdFeCo as the main component thereof with a thickness ranging from about 100 angstrom to about 400 angstrom;
a second magnetooptical layer formed on said first magnetooptical layer, said second magnetooptical layer having a Curie temperature ranging from about 110° C. to about 160° C., exhibiting iron series transition metal dominant ferrimagnetism at a temperature ranging from about 10° C. to about 90° C., and being an amorphous alloy film containing perpendicularly magnetizable TbFeTa as the main component thereof with a thickness not lower than 50 angstrom;

a third magnetooptical layer formed on said second magnetooptical layer, said third magnetooptical layer having a Curie temperature not lower than 190° C., exhibiting iron series transition metal dominant ferrimagnetism with a high coercive force not lower than 1.0 kilo-oersted at a temperature ranging from about 110° C. to about 160° C., and being an amorphous alloy film containing perpendicularly magnetizable TbFeCoTa as the main component thereof with a thickness not lower than 250 angstrom; and a dielectric protective layer formed on said third magnetooptical layer, said first magnetooptical layer, said second magnetooptical layer and said third magnetooptical layer being exchange-coupled at a temperature ranging from about 10° C. to about 90° C., said first magnetooptical layer and said third magnetooptical layer being not magnetostatically coupled in an external magnetic field for reading use at a temperature at which a magnetization of said second magnetooptical layer is substantially diminished, said external magnetic field being applied to said magnetooptical recording medium while a laser beam for reading use is moved relatively to said magnetooptical recording medium and irradiated through said transparent substrate to said first magnetooptical layer.

5. A magnetooptical recording medium comprising:

a transparent substrate;

a transparent interference layer formed on said transparent substrate;

a first magnetooptical layer formed on said transparent interference layer, said first magnetooptical layer having a Curie temperature not lower than 250° C., exhibiting iron series transition metal dominant ferrimagnetism with a coercive force lower than 0.5 kilo-oersted at a temperature ranging from about 10° C. to about 90° C., and being an amorphous alloy film consisting essentially of an iron series transition metal and a rare earth-transition metal with a thickness ranging from about 100 angstrom to 400 angstrom;

a second magnetooptical layer formed on said first magnetooptical layer, said second magnetooptical layer having a Curie temperature ranging from about 110° C. to about 160° C., exhibiting iron series transition metal dominant ferrimagnetism at a temperature ranging from about 10° C. to about 90° C., and being a perpendicularly magnetizable amorphous alloy film consisting essentially of an iron series transition metal and a rare earth transition metal with a thickness not lower than 50 angstrom;

a third magnetooptical layer formed on said second magnetooptical layer, said third magnetooptical layer having a Curie temperature not lower than 190° C., exhibiting iron series transition metal dominant ferrimagnetism with a coercive force not lower than 1.0 kilo-oersted at a temperature ranging from about 110° C. to about 160° C., and being a perpendicularly magnetizable amorphous alloy film containing an iron series transition metal and a rare earth transition metal with a thickness not lower than 250 angstrom;

a fourth magnetooptical layer formed on said third magnetooptical layer, said fourth magnetooptical layer having a Curie temperature not lower than 250° C., exhibiting iron series transition metal dominant ferrimagnetism with a coercive force lower than 0.5 kilo-oersted at a temperature ranging from about 10° C. to about 90° C., and being substantially an intra-surface-magnetizable amorphous alloy containing GdFeCo as the main component thereof; and a dielectric protective layer formed on said fourth magnetooptical layer, said first magnetooptical layer, said second magnetooptical layer and said third magnetooptical layer being exchange-coupled at a temperature ranging from about 10° C. to about 90° C., said first magnetooptical layer and said third magnetooptical layer being not magnetostatically coupled in an external magnetic field for reading use at a temperature at which magnetization of said second magnetooptical layer is substantially diminished, said external magnetic field being applied to said magnetooptical recording medium while a laser beam for reading use is moved relatively to said magnetooptical recording medium and irradiated through said transparent substrate to said first magnetooptical layer.

* * * * *

UNITED STATES PATENT AND TRADEMARK OFFICE
CERTIFICATE OF CORRECTION

PATENT NO. : 5,398,219
DATED : March 14, 1995
INVENTOR(S) : Masaki Itoh, et al.

It is certified that error appears in the above-indentified patent and that said Letters Patent is hereby corrected as shown below:

Column 10, line 25, change "tile" to --the--.

Column 20, line 11, change "200" to --400--.

Signed and Sealed this

Third Day of October, 1995

Attest:

BRUCE LEHMAN

*Attesting Officer*    *Commissioner of Patents and Trademarks*